US00RE49386E

(19) United States
(12) Reissued Patent
Suzuki et al.

(10) Patent Number: US RE49,386 E
(45) Date of Reissued Patent: Jan. 24, 2023

(54) TERMINAL DEVICE AND PRINTER

(71) Applicant: Brother Kogyo Kabushiki Kaisha, Nagoya (JP)

(72) Inventors: Takanobu Suzuki, Nagoya (JP); Takeshi Miyake, Nagoya (JP); Naoto Shiraga, Nagoya (JP); Fumio Okumura, Nagoya (JP)

(73) Assignee: Brother Kogyo Kabushiki Kaisha, Nagoya (JP)

(21) Appl. No.: 15/611,194

(22) Filed: Jun. 1, 2017

Related U.S. Patent Documents

Reissue of:
(64) Patent No.: 9,047,029
Issued: Jun. 2, 2015
Appl. No.: 14/448,026
Filed: Jul. 31, 2014

(30) Foreign Application Priority Data

Jul. 31, 2013 (JP) ..... 2013-159537

(51) Int. Cl.
*G06F 15/00* (2006.01)
*G06F 3/12* (2006.01)

(52) U.S. Cl.
CPC ..... *G06F 3/1253* (2013.01); *G06F 3/1204* (2013.01); *G06F 3/1205* (2013.01); (Continued)

(58) Field of Classification Search
CPC ..... G06F 3/1255; G06F 3/1292
See application file for complete search history.

(56) References Cited

U.S. PATENT DOCUMENTS 8,189,225 B1 5/2012 Lo et al.
8,208,161 B2 6/2012 LeVier et al.
(Continued)

FOREIGN PATENT DOCUMENTS

CN 101321226 A 12/2008
CN 102356627 A 2/2012
(Continued)

OTHER PUBLICATIONS

Nov. 20, 2018—(JP) Notification of Reasons for Rejection—App 2018-030531.
(Continued)

*Primary Examiner* — Joseph R Pokrzywa
(74) *Attorney, Agent, or Firm* — Banner & Witcoff, Ltd.

(57) ABSTRACT

A terminal device may receive print condition related information being related to an actual print condition from a printer, and register, in a print intermediation server, by using the print condition related information, printer related information including actual print condition information indicating the actual print condition. The terminal device may control a display unit to display a selection screen by using the actual print condition information in a case where file related information related to a target file is to be registered in the print intermediation server after the printer related information was registered in the print intermediation server. The selection screen may cause a user to select a print setting from among the actual print condition. The terminal device may register the file related information and print setting information in association with the printer related information in the print intermediation server.

5 Claims, 7 Drawing Sheets

(52) U.S. Cl.
CPC ..... *G06F 3/1231* (2013.01); *G06F 3/1232* (2013.01); *G06F 3/1287* (2013.01); *G06F 3/1289* (2013.01); *G06F 3/1292* (2013.01)

(56) References Cited

U.S. PATENT DOCUMENTS

| | | | | |
|---|---|---|---|---|
| 8,749,823 | B2 | 6/2014 | Kato | |
| 8,780,377 | B2 | 7/2014 | Nishida et al. | |
| 9,001,355 | B2 * | 4/2015 | Shah | G06F 3/1206 358/1.14 |
| 9,094,637 | B2 | 7/2015 | Ito | |
| 2002/0078162 | A1 * | 6/2002 | Kimura | 709/213 |
| 2002/0140972 | A1 | 10/2002 | Onishi | |
| 2003/0005050 | A1 | 1/2003 | Pineau et al. | |
| 2003/0098993 | A1 * | 5/2003 | Ohara | 358/1.15 |
| 2003/0231339 | A1 | 12/2003 | Makishima et al. | |
| 2005/0002058 | A1 | 1/2005 | Hirabayashi | |
| 2007/0146778 | A1 | 6/2007 | Kitagata et al. | |
| 2007/0283157 | A1 | 12/2007 | Tami et al. | |
| 2008/0304088 | A1 | 12/2008 | Tomihisa | |
| 2009/0036056 | A1 | 2/2009 | Oshima et al. | |
| 2010/0091321 | A1 | 4/2010 | LeVier et al. | |
| 2010/0171973 | A1 | 7/2010 | Kimura | |
| 2010/0225962 | A1 | 9/2010 | Okigami et al. | |
| 2011/0058202 | A1 | 3/2011 | St. Jacques, Jr. et al. | |
| 2011/0242569 | A1 | 10/2011 | Ohara | |
| 2011/0242599 | A1 | 10/2011 | Ohara | |
| 2011/0292445 | A1 | 12/2011 | Kato | |
| 2012/0162681 | A1 | 6/2012 | Tomita | |
| 2012/0212760 | A1 | 8/2012 | Sakura | |
| 2012/0314250 | A1 | 12/2012 | Ito | |
| 2013/0003106 | A1 | 1/2013 | Nishida et al. | |
| 2013/0003117 | A1 | 1/2013 | Hirata | |
| 2013/0047247 | A1 | 2/2013 | Matsuda | |
| 2013/0070288 | A1 | 3/2013 | Muranaka | |
| 2013/0077125 | A1 | 3/2013 | Kitagata | |
| 2013/0086638 | A1 | 4/2013 | Itogawa et al. | |
| 2013/0114107 | A1 | 5/2013 | Park | |
| 2013/0179961 | A1 | 7/2013 | Abe | |
| 2013/0215467 | A1 * | 8/2013 | Fein | G06F 3/1236 358/1.15 |
| 2013/0229672 | A1 * | 9/2013 | Naruse | H04N 1/00896 358/1.13 |
| 2013/0229683 | A1 * | 9/2013 | Nakayama | G06K 15/402 358/1.15 |
| 2013/0260683 | A1 | 10/2013 | Suzuki et al. | |
| 2013/0286425 | A1 | 10/2013 | Nakamura et al. | |
| 2013/0301080 | A1 | 11/2013 | Nakata | |
| 2014/0025832 | A1 | 1/2014 | Ito | |
| 2014/0226179 | A1 | 8/2014 | Minagawa | |
| 2014/0313539 | A1 | 10/2014 | Kawano | |
| 2014/0342665 | A1 | 11/2014 | Amano | |
| 2014/0368859 | A1 | 12/2014 | Gutnik et al. | |
| 2014/0373103 | A1 | 12/2014 | Hirata | |
| 2015/0036189 | A1 | 2/2015 | Shiraga et al. | |
| 2015/0036191 | A1 | 2/2015 | Suzuki et al. | |
| 2015/0126115 | A1 | 5/2015 | Yun et al. | |

FOREIGN PATENT DOCUMENTS

| | | | |
|---|---|---|---|
| EP | 2264588 | A2 | 12/2010 |
| JP | 2003-280832 | A | 10/2003 |
| JP | 2008-040963 | A | 2/2008 |
| JP | 2009-070240 | A | 4/2009 |
| JP | 2012-256225 | A | 12/2012 |
| JP | 2013-033437 | A | 2/2013 |
| JP | 2013-073314 | A | 4/2013 |
| WO | 2010107125 | A1 | 9/2010 |
| WO | 2013/052641 | A2 | 4/2013 |

OTHER PUBLICATIONS

Sep. 18, 2017—U.S. Notice of Allowance—U.S. Appl. No. 15/383,394.
Feb. 25, 2019—U.S. Notice of Allowance—U.S. Appl. No. 15/824,025.
Aug. 14, 2019—(EP) Summons to attend oral proceedings—App 14173971.4.
Aug. 28, 2018—(EP) Office Action—App. 14173971.4.
Aug. 13, 2015—U.S. Non-Final Office Action—U.S. Appl. No. 14/317,000.
Dec. 16, 2015—U.S. Final Office Action—U.S. Appl. No. 14/317,000.
Aug. 6, 2015—(CN) Notification of First Office Action—App 201410301816.8.
Oct. 17, 2018—U.S. Non-Final Office Action—U.S. Appl. No. 15/824,025.
Jun. 5, 2018—(JP) Notification of Reasons for Rejection—App 2017-175491.
Dec. 2, 2019—U.S. Notice of Allowance—U.S. Appl. No. 16/433,611.
Feb. 5, 2021—U.S. Final Office Action—U.S. Appl. No. 15/819,210.
Jul. 31, 2020—U.S. Non-final Office Action—U.S. Appl. No. 15/819,210.
Oct. 27, 2014—(EP) Extended European Search Report—App 14173971.4.
"What is Google Cloud Print", online, Jun. 25, 2013, <URL: http://developers.google.com/cloud-print/>and <URL: http://developers.google.com/cloud-print/docs/overview>.
Co-Pending U.S. Appl. No. 14/317,000, filed Jun. 27, 2014.

* cited by examiner (First Embodiment)
Registration Process (Method of OAuth)

(Fourth Embodiment)

Registration Process (Method of Client Login)

TERMINAL DEVICE AND PRINTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a Reissue of U.S. Pat. No. 9,047,029, which issued Jun. 2, 2015 and was filed on Jul. 31, 2014 as application Ser. No. 14/448,026, which application* claims priority to Japanese Patent Application No. 2013-159537, filed on Jul. 31, 2013, the contents of which are hereby incorporated *herein* by reference[into the present application.]*, and, co-pending U.S. application Ser. No. 15/819,210, filed Nov. 21, 2017 is a continuation Reissue of this application, and also is a Reissue of U.S. Pat. No. 9,047,029.*

TECHNICAL FIELD

The present specification discloses a technique in which a terminal device causes a printer to perform a print using a print intermediation server.

DESCRIPTION OF RELATED ART

A technique of causing a printer to perform a print, by sending data from a terminal device to a server, and receiving at the printer the data from the server is known. For example, a service on the Internet called Google (registered trademark) Cloud Print (referred to as "GCP" below) is known. For example, a user accesses a printer by using a terminal device, and causes the printer to perform a communication with a server which provides the GCP (referred to as a "GCP server" below). By this means, the printer can register printer related information being related to the printer in the GCP server. The printer related information includes actual print condition information indicating an actual print condition (e.g., paper size, number of colors etc.) which is capable of being used actually in the printer. Consequently, an XMPP (abbreviation of eXtensible Messaging and Presence Protocol) connection is established between the printer and the GCP server. Subsequently, when an image file which represents an image of a print target is to be submitted to the GCP server, the terminal device obtains the actual print condition information from the GCP server, and displays a print setting selection screen for causing the user to select a print setting from the actual print condition. Then, the terminal device submits to the GCP server the image file and print setting information indicating the print setting selected by the user. In this case, by using the XMPP connection, the GCP server supplies a submit notification to the printer. When obtaining the submit notification from the GCP server, the printer obtains from the GCP server print data created from the image file in accordance with the print setting, and performs a print of an image represented by the print data.

SUMMARY

According to the above technique, the user needs to cause the printer to perform a communication with the GCP server in order to register the printer related information in the GCP server. The present specification provides a technique that may improve a user convenience.

A terminal device may comprise: a processor; and an instruction memory storing computer-readable instructions therein. The computer-readable instructions, when executed by the processor, may cause the terminal device to perform: receiving print condition related information from a printer, the print condition related information being related to an actual print condition, the actual print condition being a print condition which is capable of being used actually in the printer; and registering printer related information in a print intermediation server by using the print condition related information, the printer related information being related to the printer and including actual print condition information indicating the actual print condition.

The computer-readable instructions, when executed by the processor, may cause the terminal device to further perform: controlling a display unit of the terminal device to display a selection screen by using the actual print condition information in a case where file related information related to a target file which represents an image of a print target is to be registered in the print intermediation server after the printer related information was registered in the print intermediation server, the selection screen causing a user to select a print setting from among the actual print condition; and registering the file related information and print setting information indicating the print setting in association with the printer related information in the print intermediation server.

A printer may comprise: a print performing unit; a processor; and a memory storing computer-readable instructions therein. The computer-readable instructions, when executed by the processor, may cause the printer to perform: sending print condition related information to a terminal device, the print condition related information being related to an actual print condition which is capable of being used actually in the printer, the print condition related information being used by the terminal device to register printer related information in a print intermediation server, the printer related information being related to the printer and including actual print condition information indicating the actual print condition, the print condition related information being used by the terminal device to display a selection screen in the terminal device, the selection screen causing a user to select a print setting from among the actual print condition; receiving a print instruction including authentication information from the terminal device after the printer related information, the authentication information, file related information related to a target file which represents an image of a print target, and print setting information indicating the print setting were registered in association by the terminal device in the print intermediation server; obtaining print data from the print intermediation server by using the authentication information in a case where the print instruction was received from the terminal device, the print data being created from the target file in accordance with the print setting; and controlling the print performing unit to perform a print by using the print data.

A control method, computer-readable instructions, and a non-transitory computer-readable medium storing the computer-readable instructions, for achieving any one of the above devices (that is, the terminal device or the printer), are also new and useful. Further, a communication system which has the above terminal device and printer is also new and useful.

EMBODIMENT

First Embodiment

Figure 1:
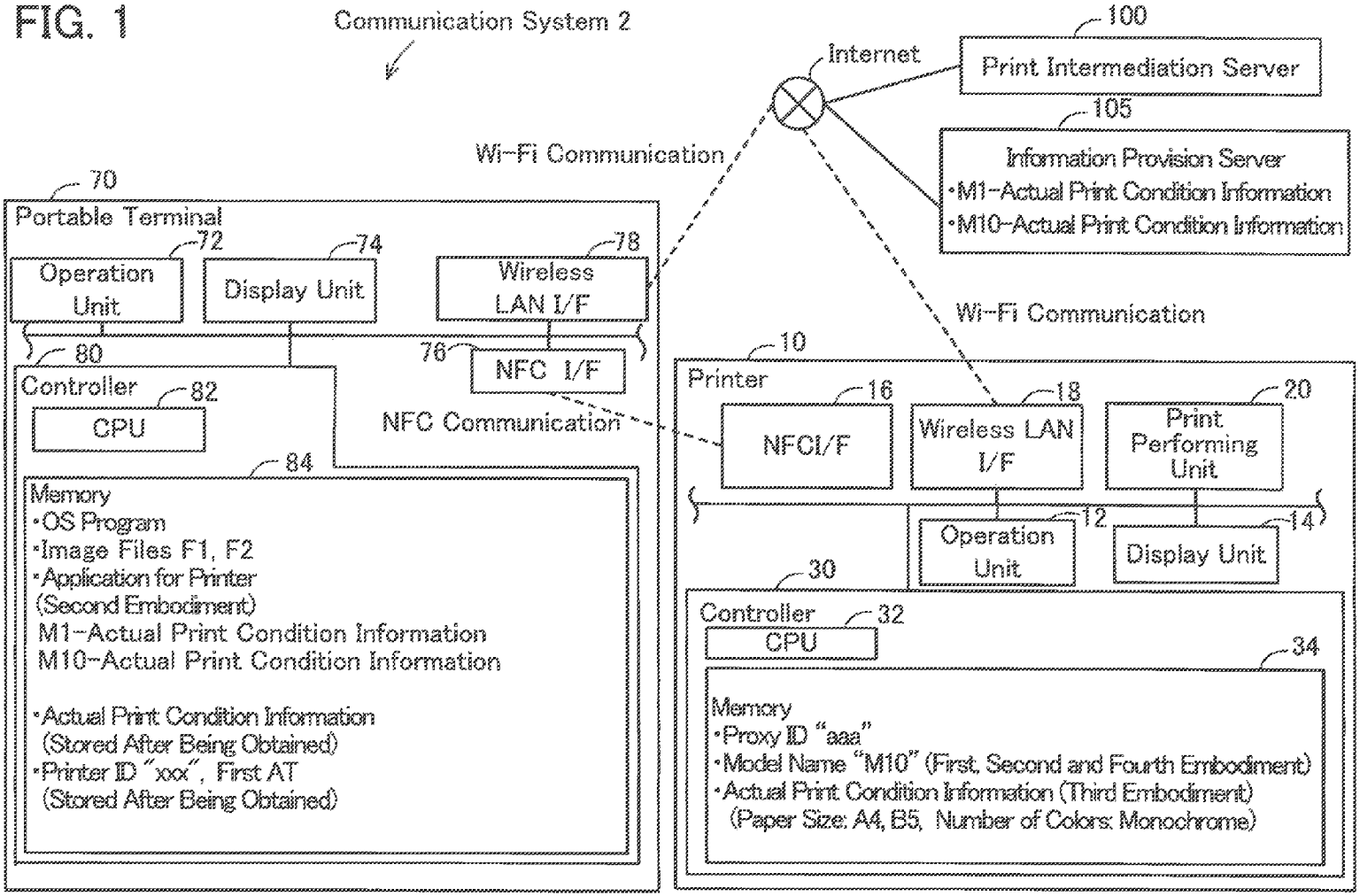
FIG. 1 illustrates a configuration of a communication system.

As illustrated in FIG. 1, a communication system 2 has a printer 10, a portable terminal 70, a print intermediation server 100 and information providing server 105. Each of the devices 10, 70 100 and 105 can perform a communication with each other via the Internet.

(Configuration of Printer 10)

The printer 10 is a peripheral appratus (i.e. peripheral appratus of a PC or the like) which can perform a printing function. The printer 10 comprises an operation unit 12, a display unit 14, an NFC (abbreviation of Near Field Communication) interface 16 and a wireless LAN (abbreviation of Local Area Network) interface 18, a print performing unit 20 and a controller 30. Each of the units 12 to 30 is connected to a bus line (a reference numeral is not illustrated). Hereinafter, the interface will be described as an "I/F".

The operation unit 12 comprises a plurality of keys. A user can give various instructions to the printer 10 by operating the operation unit 12. The display unit 14 is a display for displaying various pieces of information. The print performing unit 20 is a printing mechanism such as an ink jet printing ora laser printing.

The NFC I/F 16 is an I/F (i.e. an IC chip or a communication circuit) for performing a wireless communication in accordance with an NFC scheme for a so-called short distance wireless communication (referred to as an "NFC communication" below). The NFC scheme, for example, is a wireless communication scheme based on an international standard of ISO/IEC21481 or 18092.

The wireless LAN I/F 18 is an I/F (i.e. an IC chip or a communication circuit) for performing a wireless communication in accordance with the Wi-Fi scheme defined by the Wi-Fi Alliance (referred to as a "Wi-Fi communication" below). The Wi-Fi scheme, for example, is a wireless communication scheme based on the standard of 802.11 of IEEE (abbreviation of The Institute of Electrical and Electronics Engineers, Inc.) and a standard (e.g. 802.11a, 11b, 11g or 11n) equivalent to this standard. The wireless LAN I/F 18 may be an I/F for performing a wireless communication via an access point (e.g. a wireless communication of an infrastructure scheme), or may be an I/F for performing a wireless communication not via an access point (e.g. a wireless communication of an ad-hoc scheme or a Wi-Fi Direct scheme).

Here, a difference between the NFC I/F 16 and the wireless LAN I/F 18 will be described. A communication speed (e.g. a maximum communication speed is 11 to 600 Mbps) of a wireless communication via the wireless LAN I/F 18 is faster than a communication speed (e.g. a maximum communication speed is 100 to 424 Kbps) of a wireless communication via the NFC I/F 16. Further, a frequency of a carrier wave (e.g. a 2.4 GHz band or a 5.0 GHz band) upon a wireless communication via the wireless LAN I/F 18 is different from a frequency of a carrier wave (e.g. a 13.56 MHz band) upon a wireless communication via the NFC I/F 16. Furthermore, for example, when a distance between the NFC I/F 16 of the printer 10 and an NFC I/F of another apparatus (e.g. the portable terminal 70) is about 10 cm or less, the controller 30 can perform an NFC communication with said apparatus via the NFC I/F 16. However, a distance between the NFC I/F 16 of the printer 10 and an NFC I/F of another apparatus is more than 10 cm, the controller 30 can not perform an NFC communication with said apparatus via the NFC I/F 16. Meanwhile, even when a distance between the wireless LAN I/F 18 of the printer 10 and the wireless LAN I/F of another apparatus (e.g. the portable terminal 70, an access point) is 10 cm or less or 10 cm or more (e.g. about 100 m at maximum), the controller 30 can perform a Wi-Fi communication with the apparatus via the wireless LAN I/F 18. That is, a maximum distance at which the printer 10 can perform a wireless communication with another apparatus via the wireless LAN I/F 18 is longer than a maximum distance at which the printer 10 can perform a wireless communication with another apparatus via the NFC I/F 16.

The controller 30 comprises a CPU 32 and a memory 34. The CPU 32 is a processor which performs various processes in accordance with a program (not illustrated) stored in the memory 34. The memory 34 is configured by a RAM, a ROM, and the like. The memory 34 further stores a proxy ID "aaa" for identifying the printer 10, and a model name "M10" indicating model (that is, type, model) of the printer 10.

(Configuration of Portable Terminal 70)

The portable terminal 70 is a portable terminal device such as a mobile telephone (e.g. a smartphone), a PDA, a notebook PC, a tablet PC, a portable music playback device or a mobile movie playback device. The portable terminal 70 comprises an operation unit 72, a display unit 74, an NFC I/F 76, a wireless LAN I/F 78 and a controller 80. Each of the units 72 to 80 is connected to a bus line (a reference numeral is not illustrated).

The operation unit 72 comprises a plurality of keys. A user can give various instructions to the portable terminal 70 by operating the operation unit 72. The display unit 74 is a display for displaying various pieces of information. The NFC I/F 76 and the wireless LAN I/F 78 are the same as the NFC I/F 16 and the wireless LAN I/F 18 of the printer 10, respectively. Hence, the difference between the NFC I/F 76 and the wireless LAN I/F 78 is the same as the difference between the NFC I/F 16 and the wireless LAN I/F 18.

The controller 80 comprises a CPU 82 and a memory 84. The CPU 82 is a processor which performs various processes in accordance with an OS program stored in the memory 84. The memory 84 is configured by a RAM, a ROM, and the like. The memory 84 further stores a plurality of image files F1, F2, and an application for the printer (referred to as "printer appl." below).

Each of the image files F1, F2 is a file representing an image captured by e.g., the portable terminal 70. Each of the image files F1, F2 may be a file in any file format, e.g., may be a file in bitmap format such as JPEG (abbreviation of Joint Photographic Experts Group), may be a file in vector format, or may be a file in text format.

The printer appl. is an application for causing the printer 10 to perform a print by using the print intermediation server 100. The printer appl. is an application provided by a vendor of the printer 10. The printer appl. may be installed to the portable terminal 70 from a server on the Internet or may be installed to the portable terminal 70 from a medium shipped together with the printer 10.

The memory 84 further stores actual print condition information obtained from the information providing server 105. The actual print condition information indicates an actual print condition which is capable of being used actually in the printer 10. The actual print condition information includes sheet size information indicating sizes of print sheets, and number of colors information indicating number of colors. The sheet size information included in the actual print condition information indicates "A4" and "B5". The number of colors information included in the actual print condition information indicates "monochrome print". Moreover, the actual print condition information may further include other information indicating whether it is capable of duplex printing, page orientation (e.g., landscape print, portrait print) etc.

The memory 84 further stores a printer ID "xxx" and a first AT (abbreviation of Authentication (or Access) Token) obtained from the print intermediation server 100. The printer ID "xxx" and the first AT are authentication information for the print intermediation server 100 to perform authentication, and are created by the print intermediation server 100.

(Configuration of Print Intermediation Server 100)

The print intermediation server 100 is a server which is located on the Internet, and is, for example, a GCP server provided by Google (registered trademark). In this regard, in modified embodiments, the print intermediation server 100 may be a server provided by the vendor of the printer 10 or may be a server provided by a business operator different from the vendor of the printer 10.

The print intermediation server 100 is a server for performing an intermediation of a print between an external apparatus (e.g. the portable terminal 70) and a printer (e.g. the printer 10). That is, the print intermediation server 100 converts image data submitted from the external apparatus, creates print data in a data format which can be interpreted by the printer, and supplies the print data to the printer. Therefore, even when the external appratus does not comprise a printer driver for converting the image data into the print data, the external appratus can cause the printer to perform a print by submitting the image data to the print intermediation server 100.

(Configuration of Information Providing Server 105)

The information providing server 105 is a server which is located on the Internet, and is a server provided by the vendor of the printer 10.

For each of a plurality of models of printers sold by the vendor of the printer 10, the information providing server 105 associates a model name of the printer (e.g., "M1", "M10" etc.) with actual print condition information indicating an actual print condition of the printer, and stores them. The information providing server 105 can provide the actual print condition information to an external apparatus (e.g., the portable terminal 70) in response to a request from the external apparatus.

(Advance Preparation)

A user of the portable terminal 70 performs the following advance preparation to cause the printer 10 to perform a print by using the print intermediation server 100.

That is, the user of the portable terminal 70 registers account information AC in the print intermediation server 100 by using, for example, the portable terminal 70. The account information AC includes e.g., a user ID, password or the like. Moreover, the user may register the account information AC in the print intermediation server 100 by using another apparatus (e.g., PC, etc.) instead of by using the portable terminal 70. If the account information AC of the user is registered in the print intermediation server 100, the user can cause the printer 10 to perform a print by using the print intermediation server 100.

Figure 2:
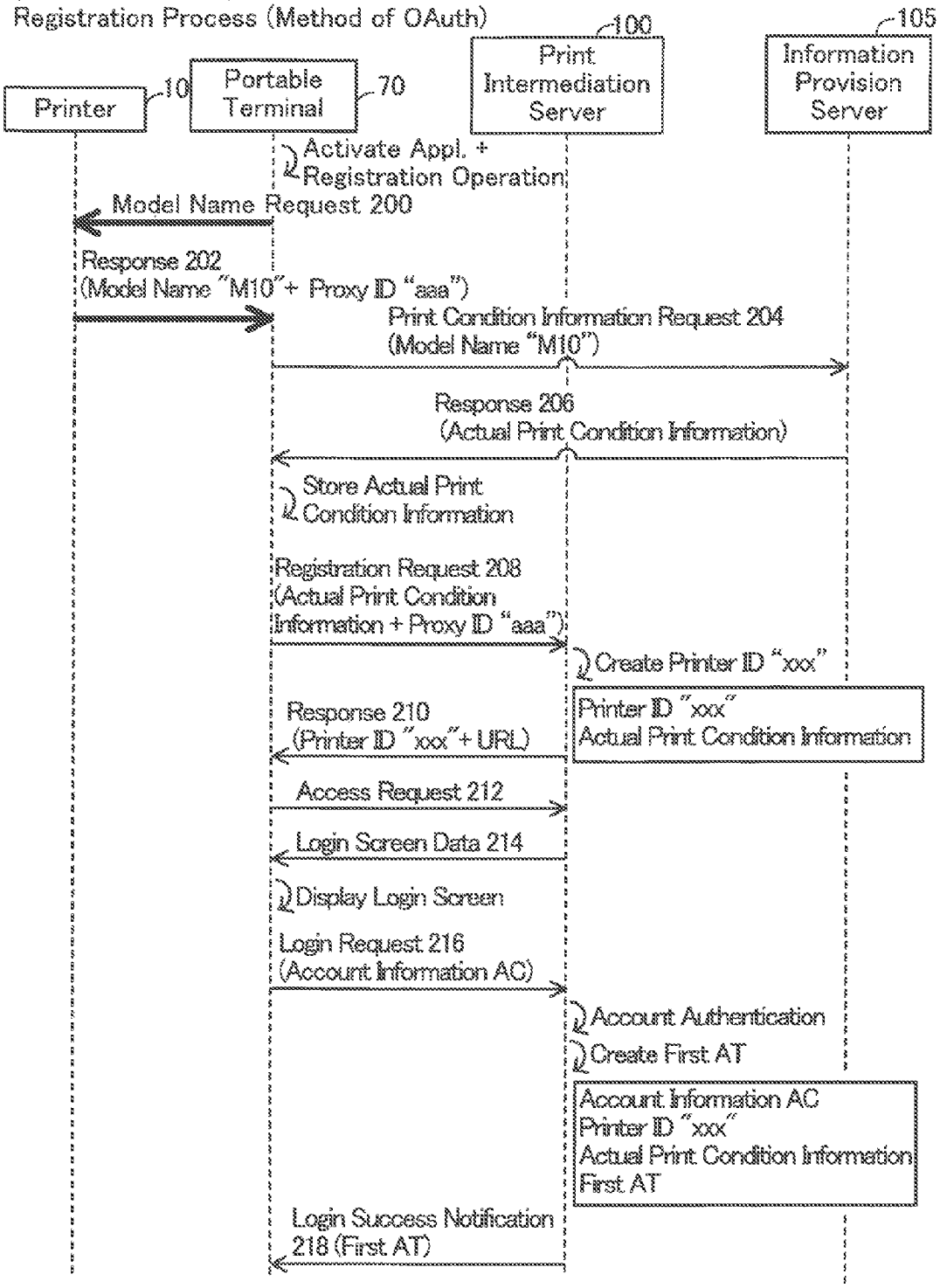
FIG. 2 illustrates a sequence diagram of a registration process.

(Registration Process; FIG. 2)

Subsequently, a registration process for the portable terminal 70 to register various information in the print intermediation server 100 will be described with reference to FIG. 2. In the registration process of the present embodiment, the so-called OAuth method is used. The fat arrows and the thin arrows in FIG. 2 indicate NFC communication and Wi-Fi communication respectively. The same also applies for subsequent figures.

In the registration process, the user of the portable terminal 70 needs to be present near the printer 10. As described below, this is because the portable terminal 70 and the printer 10 need to perform an NFC communication.

The user of the portable terminal 70 first activates the printer appl. installed in the portable terminal 70, and performs a retistration operation. The registration operation includes selecting a button indicating "registration" displayed on a screen in accordance with the printer appl. When the registration operation is performed, the CPU 82 of the portable terminal 70 performs each process illustrated in FIG. 2 in accordance with the printer appl.

The CPU 82 of the portable terminal 70 first causes the display unit 74 to display a message prompting the portable terminal 70 to be placed close to the printer 10. Consequently, the user of the portable terminal 70 places the portable terminal 70 close to the printer 10. When a distance between the NFC I/F 16 of the printer 10 and the NFC I/F 76 of the portable terminal 70 (referred to as "device distance" below) changes from a state of being greater than a predetermined distance (e.g., 10 cm) to a state of being the predetermined distance or less, a communication link of the NFC scheme (referred to as "NFC link" below) is established between the two NFC I/Fs 16, 76.

The CPU 82 of the portable terminal 70 sends a model name request 200 to the printer 10 by using the NFC link. Here, due to performing an NFC communication, the CPU 82 can send the model name request 200 to the printer 10 without using the IP addresses of the sending destination and sending source, the URLs of the sending destination and sending source, etc. Below, also, when NFC communication is performed, the IP addresses of the sending destination and sending source, the URLs of the sending destination and sending source, etc. are not used.

When receiving the model name request 200 from the portable terminal 70 by using the NFC link, the CPU 32 of the printer 10 obtains the model name "M10" and proxy ID "aaa" of the printer 10 from the memory 34 (see FIG. 1). Then, the CPU 32 sends a response 202 including the model name "M10" and the proxy ID "aaa" to the portable terminal 70 by using the same NFC link.

When sending of the response 202 to the portable terminal 70 has ended, the CPU 32 of the printer 10 causes a message indicating that the NFC communication has ended to be displayed on the display unit 14. By this means, the user of the portable terminal 70 can learn that the NFC communication has ended, and can move the portable terminal 70 away from the printer 10. Consequently, the device distance reaches a state larger than the predetermined distance, and the NFC link is disconnected.

The CPU 82 of the portable terminal 70 can obtain the model name "M10" and proxy ID "aaa" of the printer 10 by receiving the response 202 from the printer 10. In this case, the CPU 82 supplies a print condition information request 204 including the model name "M10" to the information providing server 105 via the wireless LAN I/F 78 (i.e., performs a Wi-Fi communication). Moreover, a URL of the information providing server 105, which is a supply destination of the print condition information request 204, is registered in advance in the printer appl. Below, unless described in particular, the URL of the request supply destination is registered in advance in the printer appl.

When obtaining the print condition information request 204 from the portable terminal 70, the information providing server 105 extracts the actual print condition information associated with the model name "M10" included in the print condition information request 204 from among the information which the information providing server 105 is itself storing. Next, the information providing server 105 supplies a response 206 including the actual print condition information to the portable terminal 70.

The CPU 82 of the portable terminal 70 can obtain the actual print condition information indicating the actual print condition of the printer 10 by obtaining the response 206 from the information providing server 105 via the wireless LAN I/F 78. In this case, the CPU 82 stores the actual print condition information in the memory 84 (see FIG. 1).

Next, the CPU 82 of the portable terminal 70 supplies a registration request 208 to the print intermediation server 100 via the wireless LAN I/F 78. The registration request 208 includes the actual print condition information obtained from the information providing server 105, and the proxy ID "aaa" included in the response 202 received from the printer 10.

When obtaining the registration request 208 from the portable terminal 70, the print intermediation server 100 creates the printer ID "xxx" for identifying the printer 10, which is the registration target, by using the proxy ID "aaa" included in the registration request 208.

Next, the print intermediation server 100 associates the printer ID "xxx" of the printer 10 with the actual print condition information included in the registration request 208, and stores them. In FIG. 2, boxes on the right of the broken line corresponding to the print intermediation server 100 indicate that each piece of information in the boxes is associated with each other. The same also applies for FIG. 3 and subsequent figures.

Next, the print intermediation server 100 sends to the portable terminal 70 a response 210 including the printer ID and a login URL which indicates a location of login screen data 214 described below.

When receiving the response 210 from the print intermediation server 100 via the wireless LAN I/F 78, the CPU 82 of the portable terminal 70 stores in the memory 84 the printer ID "xxx" included in the response 210 (referred to FIG. 1). Next, the CPU 82 sends an access request 212 to the print intermediation server 100 via the wireless LAN I/F 78 with the login URL included in the response 210 as the sending destination.

When receiving the access request 212 from the portable terminal 70, the print intermediation server 100 sends the login screen data 214 to the portable terminal 70. The login screen data 214 is data which represents a login screen for inputting account information (i.e. a user ID, a password and the like).

When receiving the login screen data 214 from the print intermediation server 100 via the wireless LAN I/F 78, the CPU 82 of the portable terminal 70 displays on the display unit 74 the login screen represented by the login screen data 214. The user inputs, in the portable terminal 70 by using the operation unit 72, the account information AC registered in the print intermediation server 100 upon the above advance preparation. In this case, the CPU 82 sends a login request 216 including the account information AC, to the print intermediation server 100 via the wireless LAN I/F 78.

It should be noted that, the account information AC is inputted to the portable terminal 70 by the user in the present embodiment. Instead, when, for example, the above advance preparation is performed by using the portable terminal 70, the memory 84 of the portable terminal 70 may store the account information AC. In this case, the CPU 82 of the portable terminal 70 may obtain the account information AC from the memory 84 without causing the user to input the account information AC, and send the login request 216 including the account information AC to the print intermediation server 100.

When receiving the login request 216 from the portable terminal 70, the print intermediation server 100 performs authentication of the account information AC included in the login request 216. More specifically, the print intermediation server 100 judges whether or not the account information AC included in the login request 216 is already registered in the print intermediation server 100. When judging that the account information AC is not yet registered, that is, when failing to authenticate the account information AC, the print intermediation server 100 sends a login failure notification to the portable terminal 70 although not illustrated. In this case, the registration process is finished without performing subsequent processes.

When judging that the account information AC is already registered, that is, when succeeding to authenticate the account information AC, the print intermediation server 100 creates a first AT which is a unique token (i.e., character string). Then, the print intermediation server 100 associates the successfully authenticated account information AC, the printer ID "xxx", the actual print condition information, and the first AT with each other and stores them. Next, the print intermediation server 100 supplies a login success notification 218 including the first AT to the portable terminal 70.

When receiving the login success notification 218 from the print intermediation server 100 via the wireless LAN I/F 78, the CPU 82 of the portable terminal 70 stores in the memory 84 the first AT included in the login success notification 218 (reffered to FIG. 1). By this means, the registration process is finished.

Figure 3:
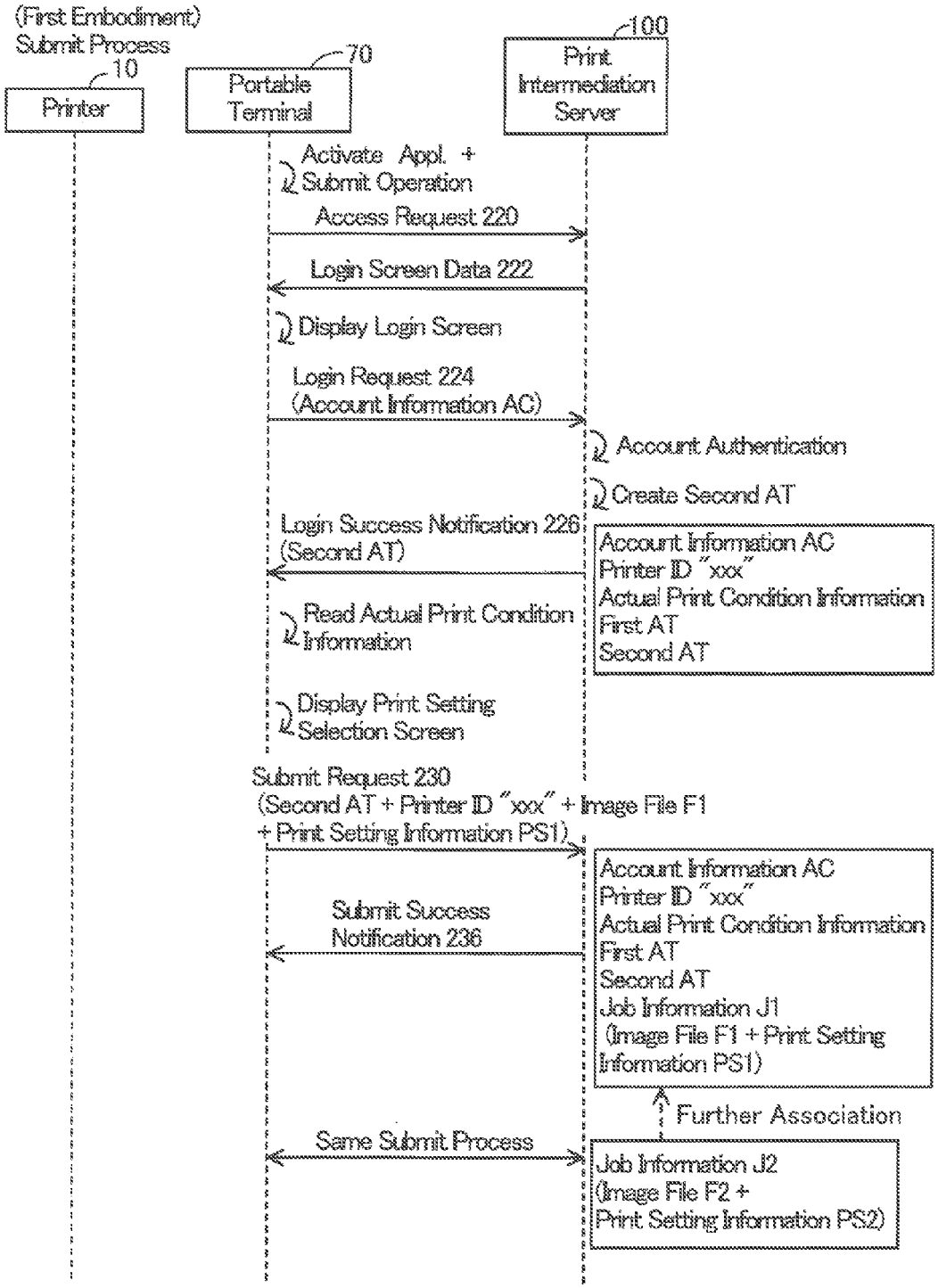
FIG. 3 illustrates a sequence diagram of a submit process.

(Submit Process; FIG. 3)

Subsequently, a submit process for submitting image data which represents a print target image from the portable terminal 70 to the print intermediation server 100 will be described with reference to FIG. 3. In the submit process, the user of the portable terminal 70 may not be present near the printer 10. For example, the user can submit image data which represents an image captured by the portable terminal 70 at a visiting place, to the print intermediation server 100.

When desiring to submit the image file F1 (see FIG. 1) in the memory 84 to the print intermediation server 100, the user of the portable terminal 70 activates the printer appl., and performs a submit operation. The submit operation includes selecting a button indicating "submit" displayed on the screen in accordance with the printer appl., and specifying the image file F1 in the memory 84. When the submit operation is performed, the CPU 82 of the portable terminal 70 performs each process illustrated in FIG. 3 in accordance with the printer appl.

The CPU 82 of the portable terminal 70 first sends an access request 220 to the print intermediation server 100 via the wireless LAN I/F 78.

When receiving the access request 220 from the portable terminal 70, the print intermediation server 100 sends login screen data 222 to the portable terminal 70.

When receiving the login screen data 222 from the print intermediation server 100 via the wireless LAN I/F 78, the CPU 82 of the portable terminal 70 causes the display unit 74 to display the login screen represented by the login screen data 222. The user inputs the account information AC in the portable terminal 70 by using the operation unit 72. In this case, the CPU 82 sends a login request 224 including the account informationAC to the print intermediation server 100 via the wireless LAN I/F 78.

When obtaining the login request 224 from the portable terminal 70, the print intermediation server 100 performs authentication of the account information AC included in the login request 224. When succeeding to authenticate the account information AC, the print intermediation server 100 creates a second AT, which is a token different from the first AT. Next, the print intermediation server 100 associates the successfully authenticated account information AC and the second AT with each other and stores them. Consequently, in the print intermediation server 100, the account information AC, the printer ID "xxx", the actual print condition information, the first AT, and the second AT are associated with each other. Then, the print intermediation server 100 supplies a login success notification 226 including the second AT to the portable terminal 70.

When obtaining the login success notification 226 from the print intermediation server 100 via the wireless LAN I/F 78, the CPU 82 of the portable terminal 70 obtains the actual print condition information from the memory 84. Then, the CPU 82 causes the display unit 74 to display a print setting selection screen by using the actual print condition information. The print setting selection screen is a screen for causing the user to select a print setting from among the actual print condition indicated by the actual print condition information. As described above, the actual print condition information includes "A4" and "B5" as the sheet size information, and "monochrome print" as the number of colors information. Consequently, the print setting selection screen has a manner which enables a selection of "A4" or "B5" as the sheet size. The user selects the print setting by selecting the sheet size (e.g., "A4") by using the operation unit 72 while looking at the print setting selection screen. The number of colors (i.e., "monochrome print") has no option, and therefore is automatically implemented in the print setting.

When the user selects a print setting, the CPU 82 of the portable terminal 70 creates a submit request 230. The submit request 230 includes the second AT included in the login success notification 226, the printer ID "xxx" in the memory 84, the image file F1 specified by the user, and print setting information PS1 indicating the print setting selected by the user. Then, the CPU 82 supplies the submit request 230 to the print intermediation server 100 via the wireless LAN I/F 78.

When obtaining the submit request 230 from the portable terminal 70, the print intermediation server 100 performs authentication of the second AT included in the submit request 230. When judging that the second AT is already registered (that is, when succeeding to authenticate the second AT), the print intermediation server 100 creates job information J1. The job information J1 includes the image file F1 and the print setting information PS1 included in the submit request 230.

Next, the print intermediation server 100 stores the job information J1 in association with the second AT and the printer ID "xxx" included in the submit request 230. Consequently, in the print intermediation server 100, the account information AC, the printer ID "xxx", the actual print condition information, the first AT, the second AT, and the job information J1 are associated with each other. Then, the print intermediation server 100 supplies a submit success notification 236 to the portable terminal 70.

The CPU 82 of the portable terminal 70 obtains the submit success notification 236 from the print intermediation server 100 via the wireless LAN I/F 78. By this means, the submit process for submitting the one piece of job information J1 ends.

When further desiring to submit another image file F2 to the print intermediation server 100, the user of the portable terminal 70 performs a submit operation which includes specifying the image file F2. By this means, the CPU 82 of the portable terminal 70 can further submit job information J2 including the image file F2 and print setting information PS2 to the print intermediation server 100 by performing a similar process to the above. As a result, in the print intermediation server 100, the account informationAC, the printer ID "xxx", the actual print condition information, the first AT, the second AT, and the two pieces of job information J1 and J2 are associated with each other.

In the present embodiment, the two pieces of job information J1, J2 are registered in association with the account information AC in the print intermediation server 100. However, the number of pieces of job information associated with the account information AC is not limited to two, but may be one, or may be three or more.

Figure 4:
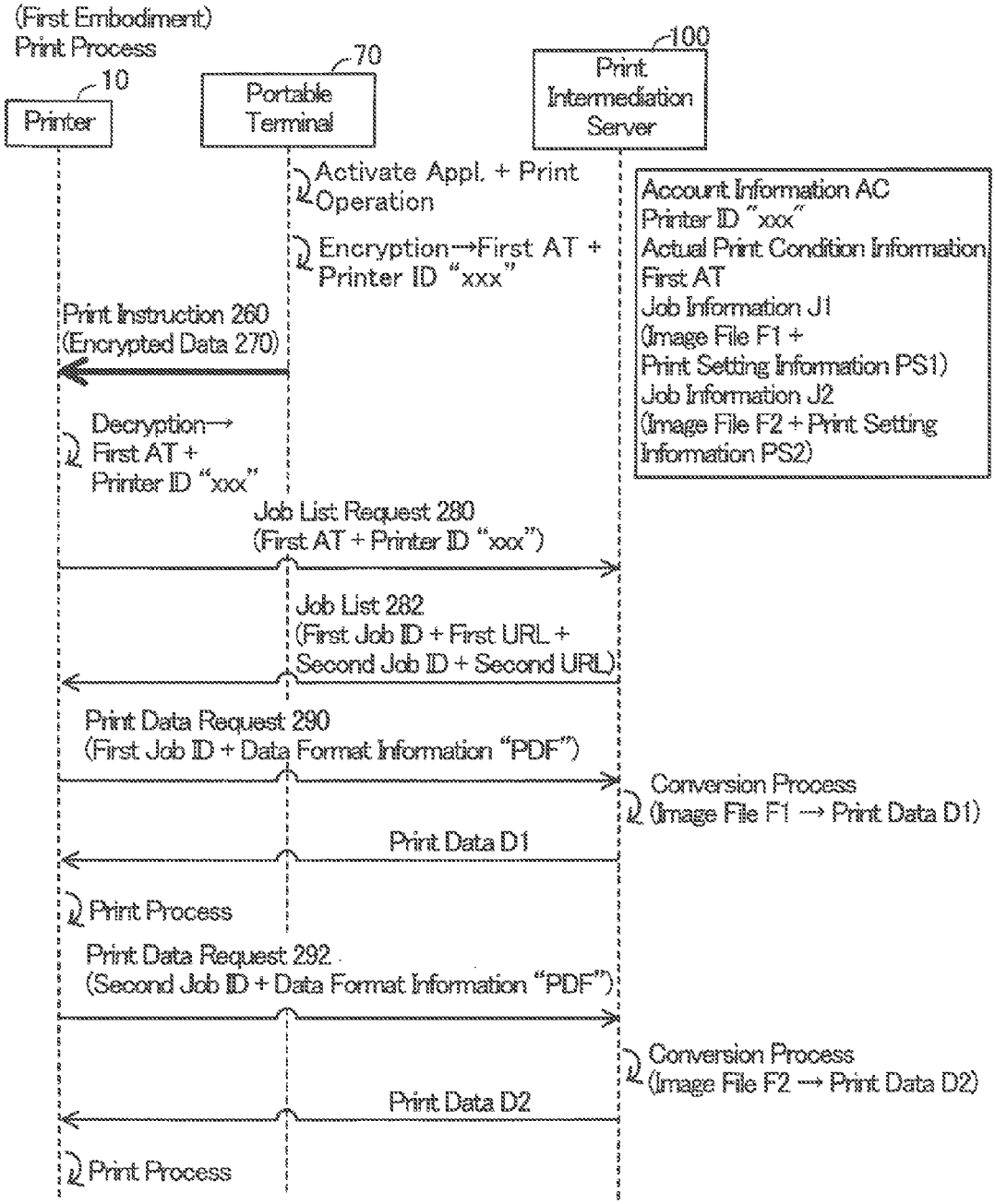
FIG. 4 illustrates a sequence diagram of a print process.

(Print Process; FIG. 4)

Subsequently, a print process in which the portable terminal 70 causes the printer 10 to perform a print with reference to FIG. 4. In the print process, the user of the portable terminal 70 needs to be present near the printer 10. Hence, the user causes the printer 10 to perform a print by using the portable terminal 70 after going home from a visiting place.

When performing the submit process in FIG. 3, in the print intermediation server 100, the account information AC, the printer ID "xxx", the actual print condition information, the first AT, the second AT and the two pieces of job information J1 and J2 are associated with each other. In this regards, as the second AT is a temporary token which is used only during the submit process, the second AT is not associated with them in FIG. 4.

When desiring to cause the printer 10 to perform a print, the user of the portable terminal 70 activates the printer appl., and performs a print operation. The print operation includes selecting a button indicating "print" displayed on the screen in accordance with the printer appl. When the print operation is performed, the CPU 82 of the portable terminal 70 performs each process illustrated in FIG. 4 in accordance with the printer appl.

The CPU 82 of the portable terminal 70 first obtains the first AT and the printer ID "xxx" (i.e. each pieces of information stored in the memory 84 in the registration process in FIG. 2) from the memory 84. Then, the CPU 82 creates encrypted data 270 by encrypting the first AT and the printer ID "xxx" by using an encryption key registered in advance in the printer appl. An encryption method is not limited in particularly, and is, for example, AES (abbreviation of Advanced Encryption Standard), DES (abbreviation of Data Encryption Standard) or the like.

Next, the CPU 82 of the portable terminal 70 causes the display unit 74 to display a message prompting the portable terminal 70 to be placed close to the printer 10. Consequently, the user of the portable terminal 70 places the portable terminal 70 close to the printer 10. By this means, the device distance changes from a state of being larger than the predetermined distance to a state of being the predetermined distance or less. Consequently, an NFC link between the two NFCs I/F 16, 76 is established.

The CPU 82 of the portable terminal 70 sends a print instruction 260 including the encrypted data 270 to the printer 10 by using the NFC link. As the first AT and the printer ID "xxx" are encrypted, it is possible to prevent a third party from illegally obtaining the first AT and the printer ID "xxx".

When receiving the print instruction 260 from the portable terminal 70 by using the NFC link, the CPU 32 of the printer 10 causes a message indicating that the NFC communication has ended to be displayed on the display unit 14. By this means, the user of the portable terminal 70 moves the portable terminal 70 away from the printer 10, and the NFC link is disconnected.

The CPU 32 of the printer 10 decrypts the encrypted data 270 by using an encryption key stored in advance in the memory 34, that is, an encryption key matching the encryption key used by the portable terminal 70. By this means, the CPU 32 can obtain the first AT and the printer ID "xxx".

Next, the CPU 32 of the printer 10 sends a job list request 280 including the obtained first AT and the printer ID "xxx" to the print intermediation server 100 via the wireless LAN I/F 18.

When obtaining the job list request 280 from the printer 10, the print intermediation server 100 performs authentication of the first AT and the printer ID "xxx" included in the job list request 280. Then, when judging that the first AT and the printer ID "xxx" are already registered (that is, when succeeding in authentication), the print intermediation server 100 creates a job list 282. In the job list 282, a first job ID and a first URL are associated with each other, and a second job ID and a second URL are associated with each other. The first job ID and the second job ID are IDs for identifying the job information J1 and the job information J2, respectively. The first URL and the second URL are URLs which indicate a location of print data to be created from image files included in the job information J1 and the job information J2, respectively. Then, the print intermediation server 100 supplies the job list 282 to the printer 10.

When obtaining the job list 282 from the print intermediation server 100 via the wireless LAN I/F 18, the CPU 32 of the printer 10 creates a print data request 290. The print data request 290 includes the first job ID included in the job list 282, and data format information indicating data format which can be interpreted by the printer 10. In the present embodiment, the data format is "PDF (abbreviation of Portable Document Format)", but in a modified embodiment the data format may be "PWG-Raster", "XPS (abbreviation of XML Paper Specification)", etc. Next, the CPU 32 supplies the print data request 290 to the print intermediation server 100 via the wireless LAN I/F 18 with the first URL included in the job list 282 as the supply destination.

When obtaining the print data request 290 from the printer 10, the print intermediation server 100 performs a conversion process by using the job information J1 identified by the first job ID included in the print data request 290. Specifically, the print intermediation server 100 converts the image file F1 included in the job information J1 in accordance with the print setting information PS1 included in the job information J1 and in accordance with the data format information "PDF" included in the print data request 290, and creates print data D1. For example, when the print setting information PS1 indicates that sheet size is "A4" and number of colors is "monochrome print", the print intermediation server 100 creates PDF format print data D1 for performing a print of a monochrome image on A4 print sheets.

Next, the print intermediation server 100 stores the created print data D1 in a position corresponding to the first URL. Then, the print intermediation server 100 supplies the print data D1 to the printer 10, the print data D1 being stored in the position corresponding to the first URL, which is the supply destination of the print data request 290.

When obtaining the print data D1 from the print intermediation server 100 via the wireless LAN I/F 18, the CPU 32 of the printer 10 supplies the print data D1 to the print performing unit 20. Consequently, the print performing unit 20 prints an image represented by the print data D1 onto the print sheet. By this means, the user of the portable terminal 70 can obtain the printed print sheet.

Next, the CPU 32 of the printer 10 supplies a print data request 292 including the second job ID included in the job list 282 and the data format information "PDF" to the print intermediation server 100 via the wireless LAN I/F 18, with the second URL included in the job list 282 as the supply destination.

When obtaining the print data request 292 from the printer 10, the print intermediation server 100 performs a conversion process using the job information J2, as with the conversion process using the job information J1, and creates print data D2. Then, the print intermediation server 100 supplies the print data D2 to the printer 10.

When obtaining the print data D2 from the print intermediation server 100 via the wireless LAN I/F 18, the CPU 32 of the printer 10 supplies the print data D2 to the print performing unit 20. Consequently, the print performing unit 20 prints an image represented by the print data D2 onto a print sheet.

Figure 5:
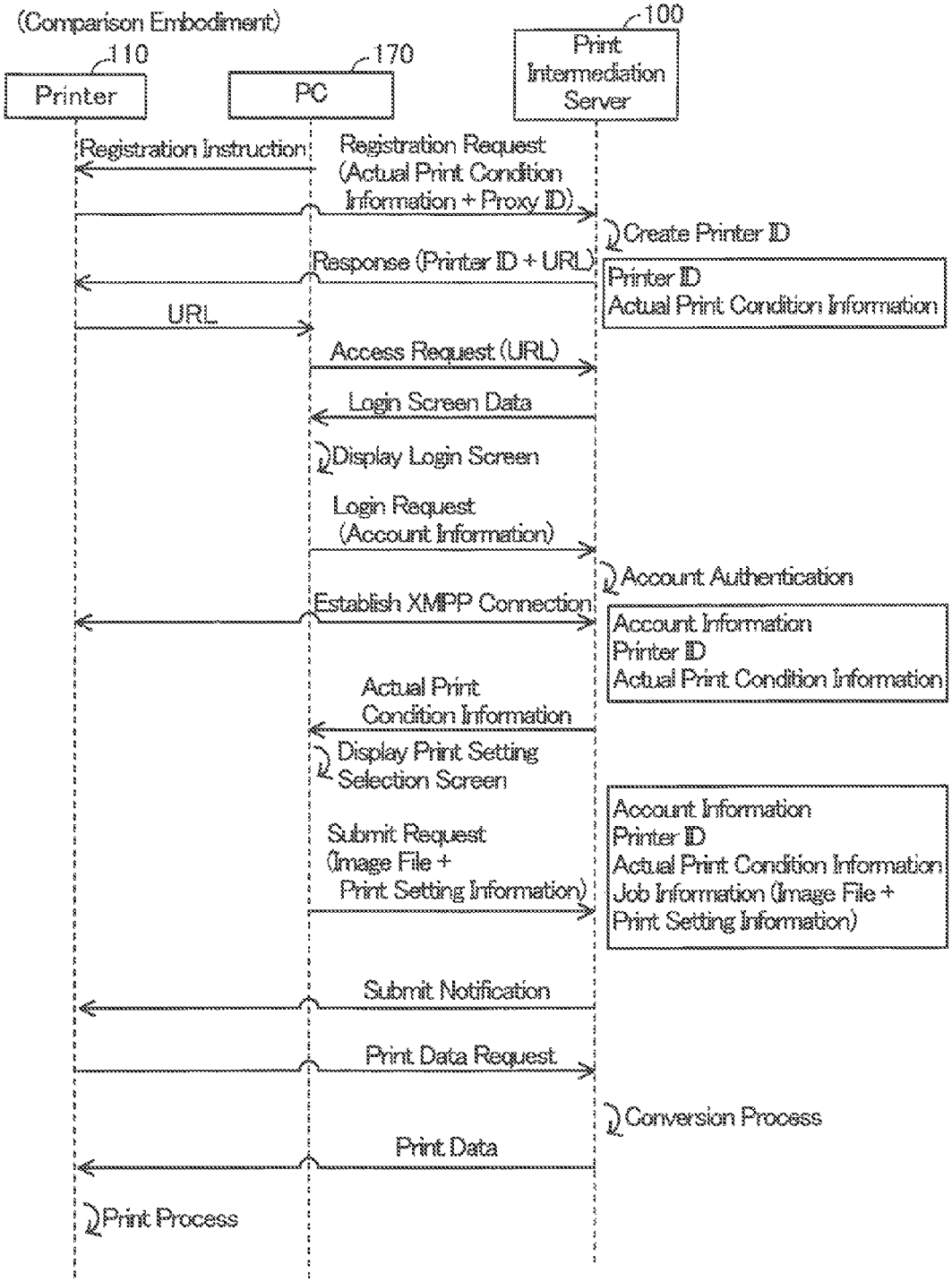
FIG. 5 illustrates a sequence diagram of a comparison embodiment.

(Comparison Embodiment; FIG. 5)

A process according to a comparison embodiment will be described with reference to FIG. 5 before an effect according to the present embodiment will be described. A system according to the comparison embodiment includes a printer 110, a PC 170 and the print intermediation server 100. The printer 110 and the PC 170 can perform a Wi-Fi communication, but cannot perform an NFC communication. Hence, all communications illustrated in FIG. 5 are Wi-Fi communications.

A user of the PC 170 first operates the PC 170 to access a web server function of the printer 110. By this means, the PC 170 accesses the web server function of the printer 110, and sends a registration instruction to the printer 110.

When receiving the registration instruction from the PC 170, the printer 110 supplies, to the print intermediation server 100, a registration request including the actual print condition information indicating the actual print condition of the printer 110, and the proxy ID of the printer 110.

When receiving the registration request from the printer 110, the print intermediation server 100 creates the printer ID for identifying the printer 110 by using the proxy ID of the printer 110 included in the registration request. Next, the print intermediation server 100 associates the printer ID with the print condition information included in the registration request, and stores them. Then, the print intermediation server 100 sends a response including the printer ID and a login URL, to the printer 110.

When receiving the response from the intermediation server 100, the printer 110 sends the login URL included in the response to the PC 170. Further, the printer 110 stores the printer ID included in the response, and performs polling with respect to the print intermediation server 100 although not illustrated. The polling is performed to establish an XMPP (abbreviation of eXtensible Messaging and Presence Protocol) connection between the printer 110 and the print intermediation server 100 when the print intermediation server 100 successfully authenticates the account information.

When receiving the login URL from the printer 110, the PC 170 sends an access request to the print intermediation server 100 with the login URL as the sending destination. As a result, PC 170 receives login screen data from the print intermediation server 100 and displays the login screen. Then, the user inputs the account information to the PC 170. In this case, the PC 170 sends the login request including the account information, to the print intermediation server 100.

When obtaining the login request from the PC 170, the print intermediation server 100 performs authentication of the account information and stores the account information when succeeding to authenticate the account information. By this means, the account information, the printer ID, and the actual print condition information are associated with each other in the print intermediation server 100.

The print intermediation server 100 establishes the XMPP connection between the print intermediation server 100 and the printer 110 in response to the polling from the printer 110 when succeeding to authenticate the account information. By this means, so-called always-on connection is established between the print intermediation server 100 and the printer 110, so that it is possible to send a submit notification described below from the print intermediation server 100 located on a WAN side to the printer 110 located on a LAN side.

Next, when an operation to submit the image file is performed, the PC 170 obtains the actual print condition information stored in the print intermediation server 100 from the print intermediation server 100. Then, the PC 170 causes the print setting selection screen to be displayed by using the actual print condition information. When the print setting is selected by the user, the PC 170 supplies a submit request including the image file and the print setting information indicating the print setting to the print intermediation server 100.

When obtaining the submit request from the PC 170, the print intermediation server 100 creates job information including the image file and the print setting information, and stores the job information. By this means, in the print intermediation server 100, the account information, the printer ID, the actual print condition information, and the job information are associated with each other.

Immediately after the image file and the print setting information are submitted, the print intermediation server 10 supplies a submit notification including a print instruction to the printer 110 by using the XMPP connection.

When obtaining the submit notification from the print intermediation server 100, the printer 110 supplies a print data request to the print intermediation server 100.

When obtaining the print data request from the printer 110, the print intermediation server 100 performs the conversion process on the image file in accordance with the print setting information, and creates print data. Then, the print intermediation server 100 supplies the print data to the printer 110.

When obtaining the print data from the print intermediation server 100, the printer 110 performs a print of an image represented by the print data.

(Effect of First Embodiment)

As described above, in the comparison embodiment in FIG. 5, the user must access the web server function of the printer 110, cause the printer 110 to perform communication of the registration request with the print intermediation server 100, and register the actual print condition information of the printer 110 in the print intermediation server 100. Since it is difficult for a user with poor knowledge of the printer 110 to access the web server function of the printer 110, it is difficult for the user to perform the operation for registering the actual print condition information.

In the present embodiment, as illustrated in FIG. 2, if the user places the portable terminal 70 near the printer 10, the portable terminal 70 receives the model name "M10" from the printer 10, and obtains the actual print condition information of the printer 10 from the information providing server 105 by using the model name "M10". Then, the portable terminal 70 registers the actual print condition information in the print intermediation server 100 by supplying the registration request 208 including the actual print condition information to the print intermediation server 100. Consequently, the user does not need to cause the printer 10 to perform a communication with the print intermediation server 100 in order to register the actual print condition information in the print intermediation server 100. Therefore, the user does not need to perform an operation for accessing the web server function of the printer 10, and if the user performs the one-touch operation of placing the portable terminal 70 close to the printer 10, the actual print condition information can be registered in the print intermediation server 100. Consequently, user convenience is high.

Further, as illustrated in FIG. 3, the portable terminal 70 displays the print setting selection screen by using the actual print condition information. For this reason, the user can select the desired print setting from the actual print condition of the printer 10 while looking at the print setting selection screen. Then, the portable terminal 70 registers the job information J1 including the image file F1 and the print setting information PS1 in the print intermediation server 100 in association with the account information AC, the printer ID "xxx", the actual print condition information etc. Consequently, the user can register the desired image file F1 and the print setting information PS1 indicating the desired print setting in the print intermediation server 100.

Further, in the comparison embodiment in FIG. 5, when the image file is to be submitted to the print intermediation server 100, the PC 170 obtains the actual print condition information of the printer 110 from the print intermediation server 100, and causes the print setting selection screen to be displayed. Therefore, in order to submit the image file, communication of the actual print condition information must be performed between the PC 170 and the print intermediation server 100, and the load on the network between the PC 170 and the print intermediation server 100 is high.

In the present embodiment, as illustrated in FIG. 2, the portable terminal 70 stores the actual print condition information of the printer 10 obtained from the information providing server 105 in the memory 84. Therefore, as illustrated in FIG. 3, when the submit operation is performed, that is, when the image file F1 is to be submitted, the portable terminal 70 can display the print setting selection screen by using the actual print condition information in the memory 84. Consequently, since the portable terminal 70 does not need to obtain the actual print condition information from the print intermediation server 100, the communication of the actual print condition information does not need to be performed between the portable terminal 70 and the print intermediation server 100 in order to submit the image file F1. Therefore, the load on the network between the portable terminal 70 and the print intermediation server 100 can be reduced.

Further, in the present embodiment, as illustrated in FIG. 4, the portable terminal 70 encrypts the first AT and the printer ID "xxx" obtained from the print intermediation server 100, and sends the print instruction 260 including the encrypted data 270 to the printer 10. Consequently, the printer 10 can supply the job list request 280 including the first AT and the printer ID "xxx" to the print intermediation server 100, obtain the print data D1, D2 from the print intermediation server 100, and perform a print. Thus, a configuration is adopted in which the print instruction 260 is sent to the printer 10 from the portable terminal 70 rather than a configuration in which a print instruction is sent to the printer 10 from the print intermediation server 100, and consequently an XMPP connection does not need to be established between the printer 10 and the print intermediation server 100. Therefore, the load on the network between the printer 10 and the print intermediation server 100 can be reduced.

(Correspondence Relationship)

The model name "M10" of the printer 10 is an example of "print condition related information" and "model information". The actual print condition information of the printer 10 is an example of "printer related information". The image file F1 is an example of "target file" and "file related information". The first AT and the printer ID "xxx" are examples of "authentication information". The print setting selection screen is an example of "selection display". The information providing server 105 is an example of "particular server". The NFC scheme and the Wi-Fi scheme are examples of "short distance communication scheme" and "predetermined communication scheme", respectively.

Second Embodiment

In the present embodiment, the information providing server 105 is not present. Then, as illustrated in FIG. 1, for each of a plurality of plurality of models of printer sold by the vendor of the printer 10, the printer appl. includes information in which the model name of the printer (e.g., "M1", "M10", etc.) and the actual print condition information indicating the actual print condition of the printer are associated.

(Registration Process; Upper Figure in FIG. 6)

Figure 6:
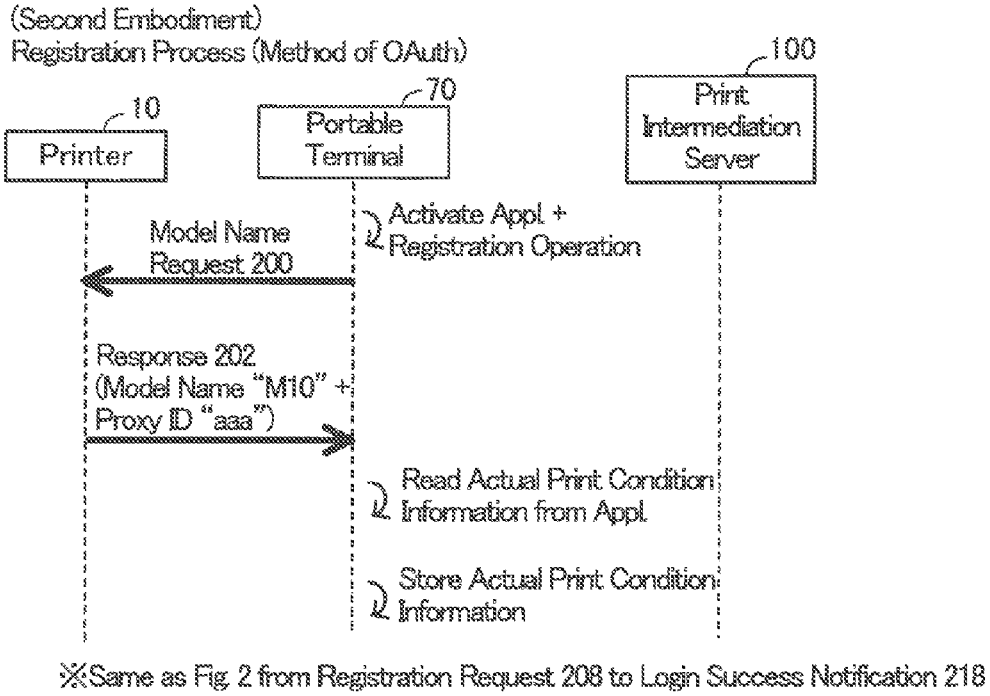
FIG. 6 illustrates a sequence diagram of a registration process according to second and third embodiments.
Figure 6:
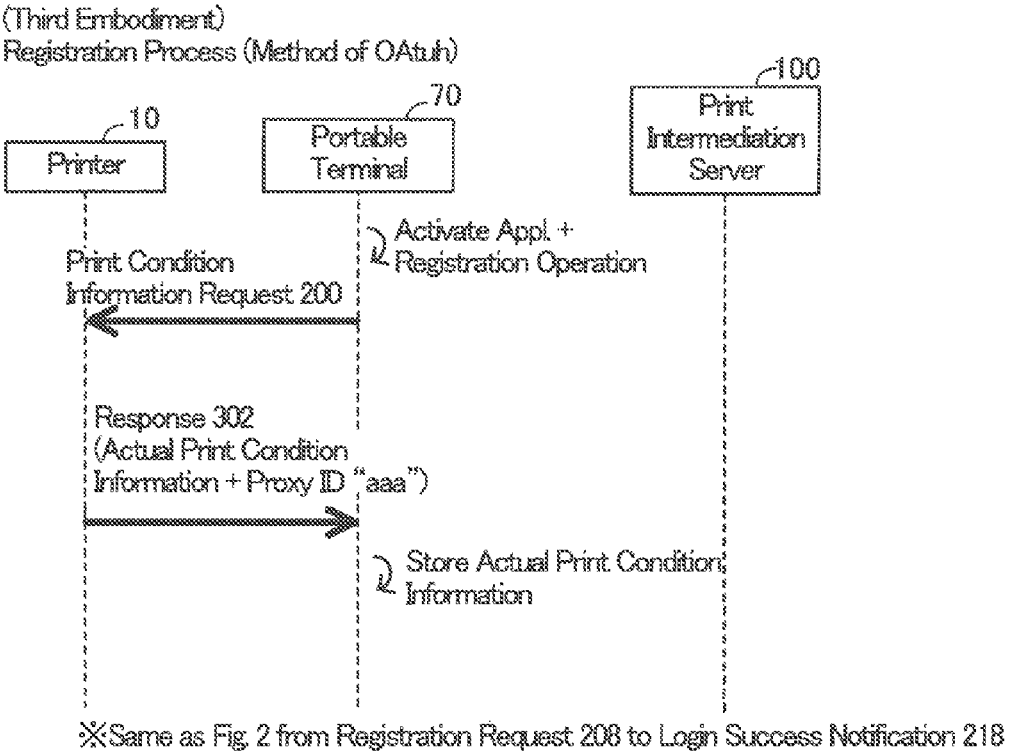

A registration process of the second embodiment will be described with reference to the upper figure in FIG. 6, omitting a description of parts the same as the first embodiment.

When the registration operation is performed by the user, the CPU 82 of the portable terminal 70 sends the model name request 200 to the printer 10, as with the first embodiment, and receives the response 202 including the model name "M10" and the proxy ID "aaa" from the printer 10.

Next, the CPU 82 of the portable terminal 70 obtains the actual print condition information of the printer 10 associated with the model name "M10" included in the response 202 from the printer appl. Then, the CPU 82 stores the obtained actual print condition information in the memory 84 as the actual print condition information to be utilized for displaying the print setting selection screen in the submit process in FIG. 3.

The processes subsequent to supplying the registration request 208 from the portable terminal 70 to the print intermediation server 100 are the same as those of the first embodiment (see FIG. 2). Further, the submit process and the print process are the same as those of the first embodiment.

The same effect as that of the first embodiment can be obtained in the present embodiment also. Further, since the information providing server 105 does not need to be provided in the present embodiment, the system can be simplified. In the present embodiment, also, the model name "M10" of the printer 10 is an example of "print condition related information" and "model information".

Third Embodiment

In the present embodiment, also, the information providing server 105 is not present. Then, as illustrated in FIG. 1, the memory 34 of the printer 10 stores the actual print condition information of the printer 10 in advance.

(Registration Process; Lower Figure in FIG. 6)

A registration process of the third embodiment will be described with reference to the lower figure in FIG. 6, omitting a description of parts the same as the first embodiment.

When the registration operation is performed by the user, the CPU 82 of the portable terminal 70 performs an NFC communication and sends a print condition information request 300 to the printer 10.

When receiving the print condition information request 300 from the portable terminal 70, the CPU 32 of the printer 10 obtains the actual print condition information and the proxy ID "aaa" from the memory 34. Then, the CPU 32 performs an NFC communication, and sends a response 302 including the actual print condition information and the proxy ID "aaa" to the portable terminal 70.

When receiving the response 302 from the printer 10, the CPU 82 of the portable terminal 70 stores the actual print condition information included in the response 302 in the memory 84.

The processes subsequent to supplying the registration request 208 from the portable terminal 70 to the print intermediation server 100 are the same as those of the first embodiment (see FIG. 2). Further, the submit process and the print process are the same as those of the first embodiment.

The same effect as that of the first embodiment can be obtained in the present embodiment also. Further, since the information providing server 105 does not need to be provided in the present embodiment, the system can be simplified. In the present embodiment, also, the actual print condition information of the printer 10 is an example of "print condition related information". That is, in the present embodiment, "print condition related information" and "actual print condition information" are the same information.

Fourth Embodiment

FIG. 7

Although the registration process is performed by using the method of OAuth in each of the above embodiments (see FIG. 2), the registration process using the method of Client Login is performed in the present embodiment.

Figure 7:
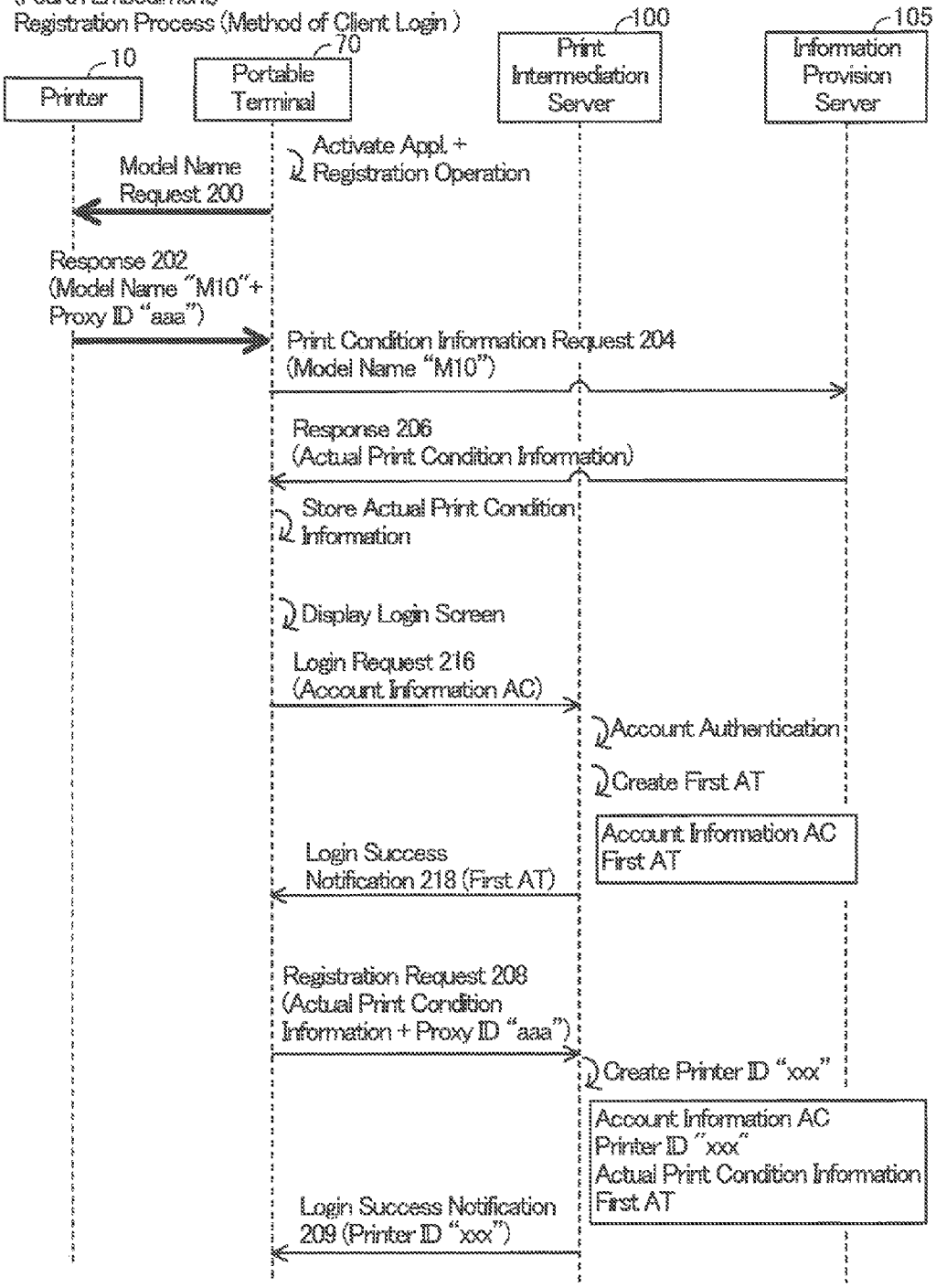
FIG. 7 illustrates a sequence diagram of a registration process according to a fourth embodiment.

As illustrated in FIG. 7, the processes of communicating each piece of information 200, 202, 204, 206 until the actual print condition information of the printer 10 is stored in the memory 84 of the portable terminal 70 are the same as those of the first embodiment (see FIG. 2).

Next, the CPU 82 of the portable terminal 70 causes the display unit 74 to display a login screen registered in advance in the printer appl. The user inputs the account information AC to the portable terminal 70 by using the operation unit 72. In this case, the CPU 82 supplies a login request 216 including the account information AC to the print intermediation server 100 via the wireless LAN I/F 78.

When obtaining the login request 216 from the portable terminal 70, the print intermediation server 100 performs authentication of the account information AC included in the login request 216, and creates the first AT when succeeding to authenticate the account information AC. Next, the print intermediation server 100 associates the successfully authenticated account information AC with the first AT, and stores them. The print intermediation server 100 supplies a login success notification 218 including the first AT to the portable terminal 70.

When obtaining the login success notification 218 from the print intermediation server 100 via the wireless LAN I/F 78, the CPU 82 of the portable terminal 70 stores in the memory 84 the first AT included in the login success notification 218. Next, the CPU 82 supplies a registration request 208 including the actual print condition information and the proxy ID "aaa" to the print intermediation server 100 via the wireless LAN I/F 78.

When obtaining the registration request 208 from the portable terminal 70, the print intermediation server 100 creates a printer ID "xxx" by using the proxy ID "aaa" included in the registration request 208. Then, the print intermediation server 100 stores the printer ID "xxx" and the actual print condition information. As a result, in the print intermediation server 100, the account information AC, the printer ID "xxx", the actual print condition information, and the first AT are associated with each other. Then, the print intermediation server 100 supplies a registration success notification 209 including the printer ID "xxx" to the portable terminal 70.

When obtaining the registration success notification 209 from the print intermediation server 100 via the wireless LAN I/F 78, the CPU 82 of the portable terminal 70 stores in the memory 84 the printer ID "xxx" included in the registration success notification 209. By this means, the registration process is finished. The submit process and the print process are the same as those in the first embodiment (see FIG. 3, FIG. 4).

In the present embodiment also, the portable terminal 70 can register the actual print condition information, the printer ID "xxx" and the like in the print intermediation server 100, and can provide the same effect as that of the first embodiment. In the present embodiment also, the first AT and the printer ID "xxx" are examples of "authentication information".

Modified Embodiment 1

In the registration process in FIG. 2, the print condition information request 204 and the response 206 communicated between the portable terminal 70 and the information providing server 105 may be omitted. In this case, the portable terminal 70 sends the registration request 208 including the model name "M10" of the printer 10 to the print intermediation server 100. Then, the print intermediation server 100 supplies a print condition information request including the model name "M10" of the printer 10 included in the registration request 208 to the information providing server 105, and obtains the actual print condition information of the printer 10 from the information providing server 105. In this modified embodiment, also, the print intermediation server 100 can associate the actual print condition information of the printer 10 with the printer ID "xxx", and store them. This modified embodiment is also an example of "registering printer related information in a print intermediation server by using the print condition related information".

Modified Embodiment 2

In the registration process in FIG. 2, the portable terminal 70 may not cause the actual print condition information of the printer 10 to be stored in the memory 84. In this case, in the submit process in FIG. 3, the portable terminal 70 obtains the actual print condition information of the printer 10 from the print intermediation server 100, and displays the print setting selection screen. That is, "storing the actual print condition information" can be omitted.

Modified Embodiment 3

In each of the above embodiments, the first AT created in the registration process in FIG. 2 is registered in the print intermediation server 100 in a situation that the print process in FIG. 4 is performed. In this regard, when the print process in FIG. 4 is performed, an expiration period of the first AT may end. Hence, in the registration process in FIG. 2, the print intermediation server 100 may create not only the first AT but also a so-called refresh token, and associate the refresh token with the account information AC or the like and store the refresh token. In this case, the print intermediation server 100 can create a new token by using the refresh token when the expiration period of the first AT ends, and store the new token instead of the first AT. Then, the portable terminal 70 receives the login success notification 218 including not only the first AT but also the refresh token from the print intermediation server 100. Then, in the print process in FIG. 4, the portable terminal 70 sends the encrypted data 270 including not only the first AT but also the refresh token to the printer 10. In this case, the printer 10 can create a new token by using the refresh token, and can obtain the print data D1, D2 from the print intermediation server 100 by using the new token when the expiration period of the first AT ends. In this modified embodiment, the refresh token is an example of "authentication information".

Modified Embodiment 4

In each of the above embodiments, e.g., in the submit process in FIG. 3, the portable terminal 70 supplies the submit request 230 including the image file F1 to the print intermediation server 100. Instead, when e.g., the image file F1 is stored on a data server on the Internet, the portable terminal 70 may supply the submit request 230 including a URL of the image file F1 to the print intermediation server 100. In this case, the print intermediation server 100 stores the job information J1 including the URL of the image file F1 and the print setting information PS1. Then, when obtaining the print data request 290 from the printer 10 in the print process in FIG. 4, the print intermediation server 100 may obtain the image file F1 from the data server by using the URL of the image file F1, convert the image file F1, and create the print data D1. In this modified embodiment, the URL of the image file F1 is an example of "file related information".

Modified Embodiment 5

In the above embodiment, "authentication information" includes a printer ID and a token (i.e. the first AT). However, if the print intermediation server 100 is configured to be capable of performing authentication by using only the printer ID without using the token, "authentication information" may include only the printer ID without including the token. Further, if the print intermediation server 100 is configured to be capable of performing authentication by using only the token without using the printer ID, "authentication information" may include only the token without including the printer ID. Generally speaking, "authentication information" may be any information used to perform authentication in the print intermediation server.

Modified Embodiment 6

"Printer related information" is not limited to the actual print condition information of the printer 10, but may include information indicating the printer name of the printer 10, information indicating a default setting of the printer 10, information indicating a status of the printer 10, etc.

Modified Embodiment 7

In each of the above embodiments, in the print process in FIG. 4, the portable terminal 70 sends the encrypted data 270 created by encrypting the printer ID "xxx" and the first AT to the printer 10. Instead, the portable terminal 70 may send the printer ID "xxx" and the first AT to the printer 10 without performing encryption. Generally speaking, it is enough to send authentication information to a printer.

Modified Embodiment 8

The printer 10 and the portable terminal 70 may perform a communication of the model name request 200, the response 202, and the print instruction 260 by performing a short distance wireless communication of another communication scheme (e.g. a wireless communication in accordance with a transfer jet scheme, an infrared scheme or the like) instead of performing a wireless communication in accordance with an NFC scheme. In this modified embodiment, the another communication scheme is an example of "short distance communication scheme". Further, the printer 10 and the portable terminal 70 may perform a communication of the model name request 200 or the like by performing a wireless communication in accordance with the Wi-Fi scheme instead of performing a short distance wireless communication. Furthermore, the printer 10 and the portable terminal 70 may perform a communication of the model name request 200 or the like by performing a wired communication instead of performing a wireless communication. Generally speaking, the communication may be any communication by which the terminal device and the printer can communicate.

Modified Embodiment 9

The portable terminal 70 may perform a wireless communication in accordance with a cellular scheme such as 3G or 4G and perform a communication with the print intermediation server 100 instead of performing a wireless communication in accordance with the Wi-Fi scheme and performing a communication of various pieces of information (e.g. the registration request 208 in FIG. 2) with the print intermediate server 100. In this modified embodiment, the cellular scheme is an example of "predetermined communication scheme". Further, the portable terminal 70 may perform a communication with the print intermediation server 100 by performing a wired communication when the portable terminal 70 is connected to the Internet with a wired connection. Generally speaking, the communication may be any communication by which the terminal device and the print intermediation server can communicate.

Modified Embodiment 10

The printer 10 may perform a wired communication with the print intermediation server 100 of various pieces of information (e.g. the job list request 280 in FIG. 4, etc.) when the printer 10 is connected to the Internet with a wired connection. Generally speaking, the communication may be any communication by which the printer and the print intermediation server can communicate.

Modified Embodiment 11

The print intermediation server 100 may not be one server and may be a plurality of servers which are configured separately. For example, the print intermediation server 100 may have a first server which performs each process illustrated by the registration process in FIG. 2 and a second server (i.e. a second server which is configured separately from the first server) which performs each process illustrated by each process subsequent to FIG. 3.

Modified Embodiment 12

"Terminal device" may not be the portable terminal 70 and may be a desktop PC or another device (e.g. a television).

Modified Embodiment 13

In the above embodiment, the CPU 32 of the printer 10 and the CPU 82 of the portable terminal 70 perform a program in the memories 34 and 84 to implement each process in FIGS. 2 to 4. Instead, at least one process of each process in FIGS. 2 to 4 may be implemented by hardware such as a logic circuit.

What is claimed is:

1. A terminal device comprising:

*a Near-Field Communication (NFC) interface;* a processor; and an instruction memory storing computer-readable instructions therein, the computer-readable instructions, when executed by the processor, causing the terminal device to perform:

receiving print condition related information from a printer *via the NFC interface*, the print condition related information being related to an actual print condition, the actual print condition being a print condition which is capable of being used actually in the printer*, the print condition related information including model information indicating a model of the printer*;

registering printer related information in a print intermediation server by using the print condition related information, the printer related information being related to the printer and including actual print condition information indicating the actual print condition, *wherein the registering of the printer related information is performed by:*

*obtaining the actual print condition information from a specific server different from the print intermediation server by using the model information; and*

*supplying a registration request including the actual print condition information to the print intermediation server;*

*obtaining authentication information from the print intermediation server, the authentication information to be registered in the print intermediation server in association with the printer related information, and the authentication information including an access token created by the print intermediation server;* controlling a display unit of the terminal device to display a selection screen by using the actual print condition information in a case where file related information related to a target file which represents an image of a print target is to be registered in the print intermediation server after the printer related information was registered in the print intermediation server, the selection screen causing a user to select a print setting from among the actual print condition; [and]

registering the file related information and print setting information indicating the print setting in association with the printer related information in the print intermediation server*; and*

*sending a print instruction including the authentication information to the printer, the authentication information being used by the printer which received the print instruction in order to obtain, from the print intermediation server, print data created from the target file in accordance with the print setting.*

[2. The terminal device as in claim 1, wherein the computer-readable instructions, when executed by the processor, cause the terminal device to further perform:

obtaining authentication information from the print intermediation server, the authentication information to be registered in the print intermediation server in association with the printer related information; and sending a print instruction including the authentication information to the printer, the authentication information being used by the printer which received the print instruction in order to obtain, from the print intermediation server, print data created from the target file in accordance with the print setting.]

[3. The terminal device as in claim 1, wherein:

the print condition related information includes model information indicating a model of the printer.]

[4. The terminal device as in claim 3, wherein:

the registering of the printer related information is performed by:

obtaining the actual print condition information from a specific server different from the print intermediation server by using the model information; and supplying a registration request including the actual print condition information to the print intermediation server.]

5. The terminal device as in claim 1, wherein the computer-readable instructions, when executed by the processor, cause the terminal device to further perform:

storing, in an information memory of the terminal device, the actual print condition information obtained by using the print condition related information, after the print condition related information was received from the printer and before the printer related information is registered in the print intermediation server, and wherein in the case where the file related information is to be registered in the print intermediation server, the controlling of the display unit is performed by using the actual print condition information in the information memory, without obtaining, from the print intermediation server, the actual print condition information included in the printer related information being registered in the print intermediation server.

[6. The terminal device as in claim 1, wherein:

the receiving of the print condition related information is performed without using position information indicating a position of the printer.]

7. The terminal device as in claim 1, wherein:

[the receiving of the print condition related information is performed by wireless communication in accordance with a short distance communication scheme, the short distance communication scheme being] *the NFC interface is configured to use* a communication scheme for wireless communication shorter than a predetermined communication scheme, the registering of the printer related information is performed by wireless communication in accordance with the predetermined communication scheme, and the registering of the file related information and the print setting information is performed by wireless communication in accordance with the predetermined communication scheme.

[8. A printer comprising:

a print performing unit;

a processor; and a memory storing computer-readable instructions therein, the computer-readable instructions, when executed by the processor, causing the printer to perform:

sending print condition related information to a terminal device, the print condition related information being related to an actual print condition which is capable of being used actually in the printer, the print condition related information being used by the terminal device to register printer related information in a print intermediation server, the printer related information being related to the printer and including actual print condition information indicating the actual print condition, the print condition related information being used by the terminal device to display a selection screen in the terminal device, the selection screen causing a user to select a print setting from among the actual print condition;

receiving a print instruction including authentication information from the terminal device after the printer related information, the authentication information, file related information related to a target file which represents an image of a print target, and print setting information indicating the print setting were registered in association by the terminal device in the print intermediation server;

obtaining print data from the print intermediation server by using the authentication information in a case where the print instruction was received from the terminal device, the print data being created from the target file in accordance with the print setting; and controlling the print performing unit to perform printing by using the print data.]

[9. The printer as in claim 8, wherein:

the sending of the print condition related information is performed by wireless communication in accordance with a short distance communication scheme, the short distance communication scheme being a communication scheme for wireless communication shorter than a predetermined communication scheme, the receiving of the print instruction is performed by wireless communication in accordance with the short distance communication scheme, and the obtaining of the print data is performed by wireless communication in accordance with the predetermined communication scheme.]

10. A non-transitory computer-readable medium storing computer-readable instructions for a terminal device, wherein the computer-readable instructions, when executed by a processor mounted on the terminal device, cause the terminal device to perform:

receiving print condition related information from a printer *via a Near-Field Communication (NFC) interface of the terminal device*, the print condition related information being related to an actual print condition, the actual print condition being a print condition which is capable of being used actually in the printer, *the print condition related information including model information indicating a model of the printer*;

registering printer related information in a print intermediation server by using the print condition related information, the printer related information being related to the printer and including actual print condition information indicating the actual print condition, *wherein the registering of the printer related information is performed by:*

*obtaining the actual print condition information from a specific server different from the print intermediation server by using the model information; and*

*supplying a registration request including the actual print condition information to the print intermediation server;*

*obtaining authentication information from the print intermediation server, the authentication information to be registered in the print intermediation server in association with the printer related information, and the authentication information including an access token created by the print intermediation server;* controlling a display unit of the terminal device to display a selection screen by using the actual print condition information in a case where file related information related to a target file which represents an image of a print target is to be registered in the print intermediation server after the printer related information was registered in the print intermediation server, the selection screen causing a user to select a print setting from among the actual print condition; [and]

registering the file related information and print setting information indicating the print setting in association with the printer related information in the print intermediation server*; and*

*sending a print instruction including the authentication information to the printer, the authentication information being used by the printer which received the print instruction in order to obtain, from the print intermediation server, print data created from the target file in accordance with the print setting.*

*11. A method comprising:*

*receiving, by a terminal device having a Near Field Communication (NFC) interface, print condition related information from a printer via the NFC interface, the print condition related information being related to an actual print condition, the actual print condition being a print condition which is capable of being used actually in the printer, the print condition related information including model information indicating a model of the printer;*

*registering printer related information in a print intermediation server by using the print condition related information, the printer related information being related to the printer and including actual print condition information indicating the actual print condition, wherein the registering of the printer related information is performed by:*

*obtaining the actual print condition information from a specific server different from the print intermediation server by using the model information; and*

*supplying a registration request including the actual print condition information to the print intermediation server;*

*obtaining authentication information from the print intermediation server, the authentication information to be registered in the print intermediation server in association with the printer related information, the authentication information including an access token created by the print intermediation server;*

*controlling a display unit of the terminal device to display a selection screen by using the actual print condition information in a case where file related information related to a target file which represents an image of a print target is to be registered in the print intermediation server after the printer related information was registered in the print intermediation server, the selection screen causing a user to select a print setting from among the actual print condition;*

*registering the file related information and print setting information indicating the print setting in association with the printer related information in the print intermediation server; and*

*sending a print instruction including the authentication information to the printer, the authentication information being used by the printer which received the print instruction in order to obtain, from the print intermediation server, print data created from the target file in accordance with the print setting.*

* * * * *